June 7, 1960    J. D. LESLIE ET AL    2,939,513
VEHICLE SEAT ADJUSTER
Filed Aug. 18, 1958    4 Sheets-Sheet 1
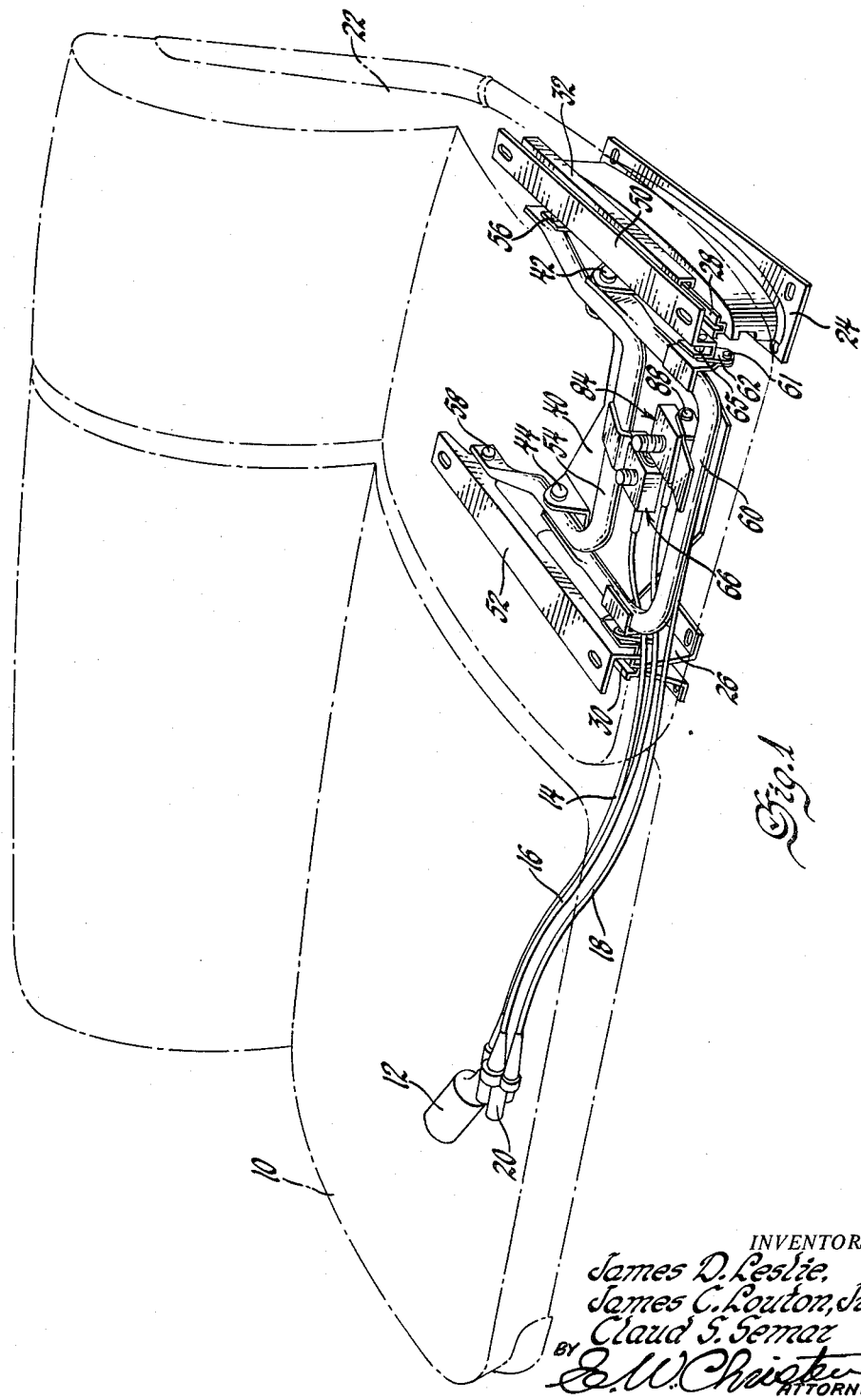
INVENTORS
James D. Leslie,
James C. Louton, Jr. &
Claud S. Sernar
BY
ATTORNEY

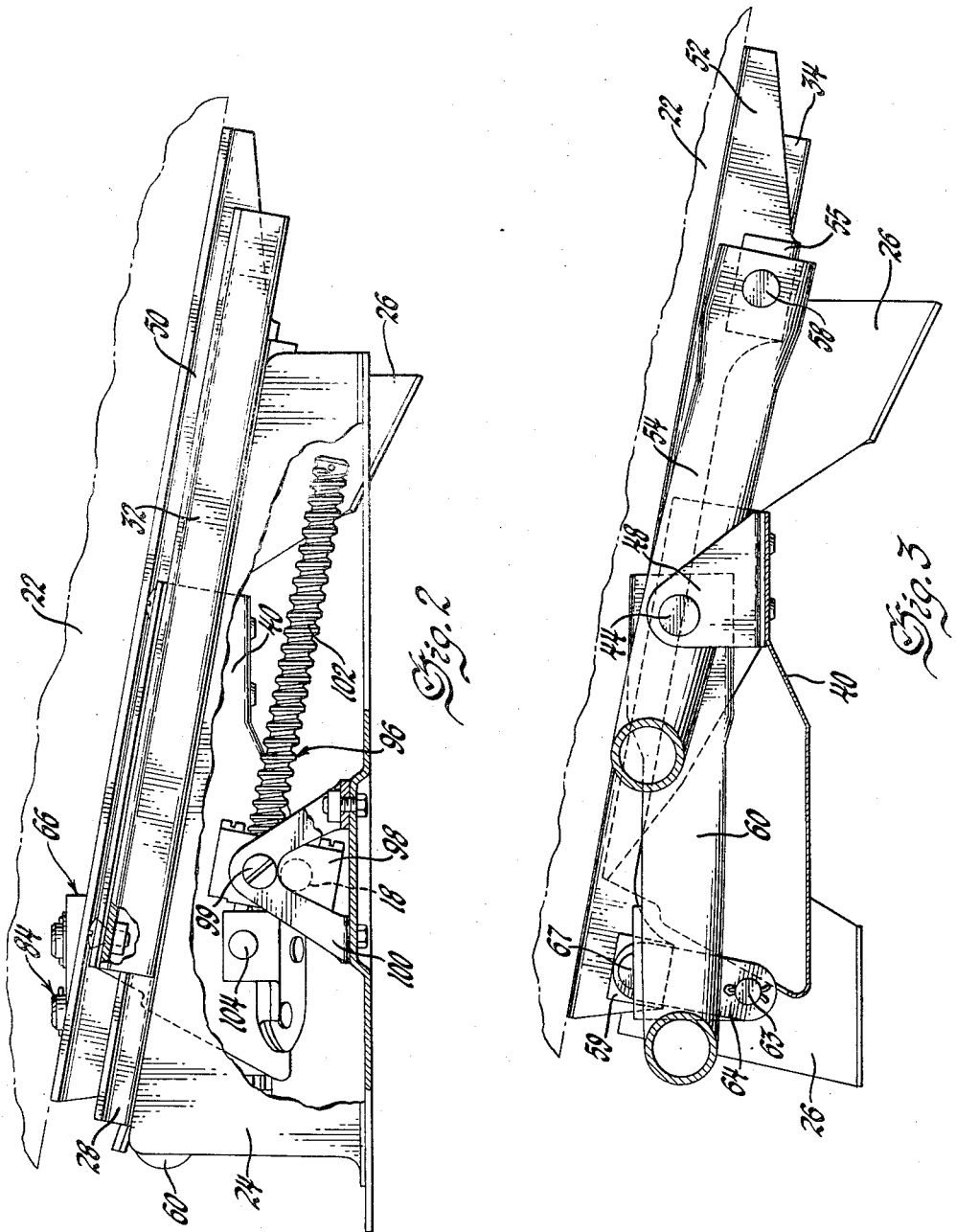

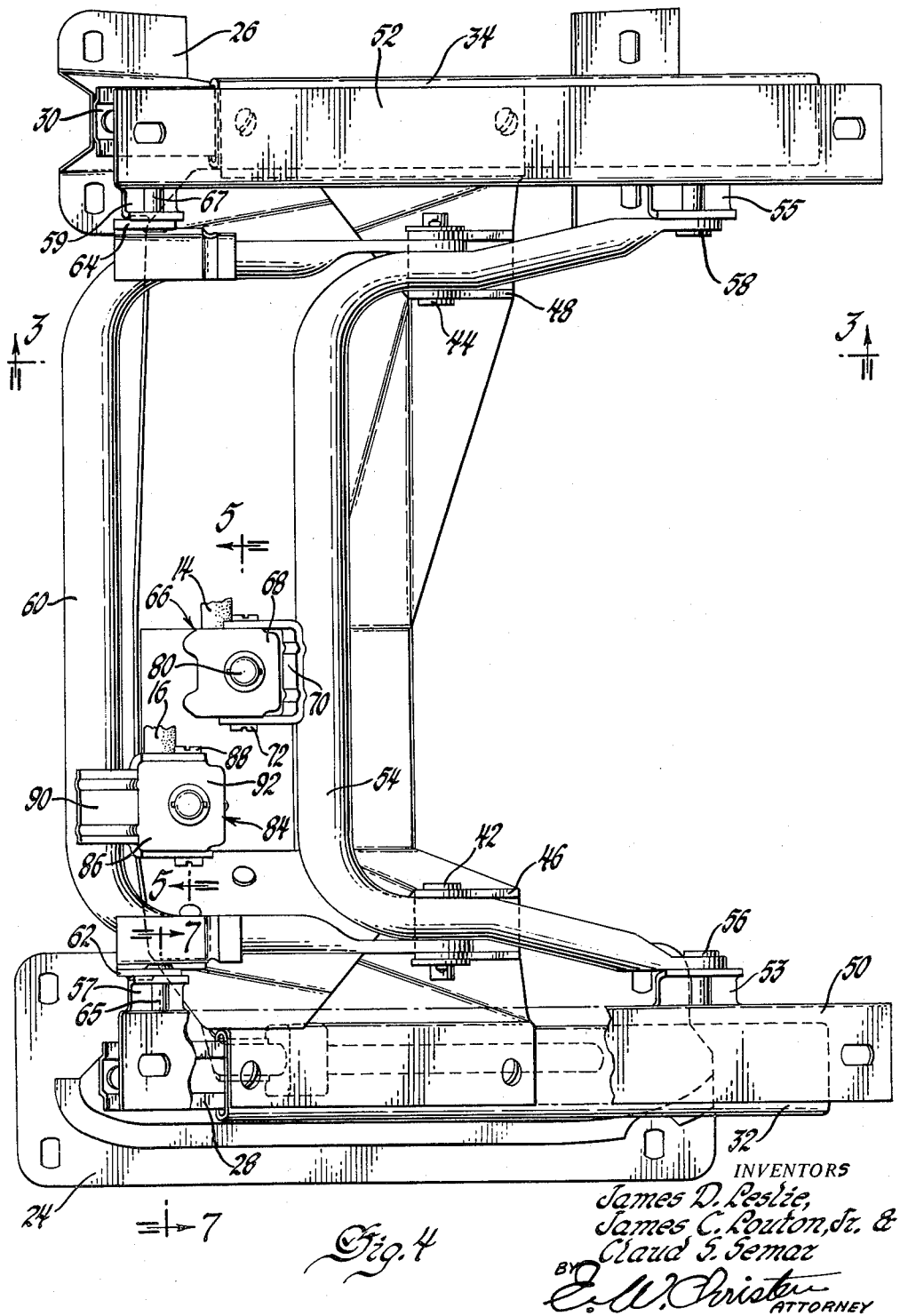

June 7, 1960  J. D. LESLIE ET AL  2,939,513
VEHICLE SEAT ADJUSTER
Filed Aug. 18, 1958  4 Sheets-Sheet 4

INVENTORS
James D. Leslie,
James C. Louton, Jr. &
Claud S. Semar
BY E.W. Chrieten
ATTORNEY

2,939,513
VEHICLE SEAT ADJUSTER

James D. Leslie, Birmingham, James C. Louton, Jr., Utica, and Claud S. Semar, Birmingham, Mich., assignors to General Motors Corporation, Detroit, Mich., a corporation of Delaware Filed Aug. 18, 1958, Ser. No. 755,642

6 Claims. (Cl. 155—14)

This invention relates to vehicle seat adjusters and more particularly to those providing selective horizontal, vertical and tilt adjustments.

As styling considerations lower the silhouettes of modern automobiles, it becomes increasingly difficult to find room beneath the front seat for power seat adjusters which provide selective horizontal, vertical and tilt adjustments because the driveshaft tunnel presents a raised area beneath the central portion of the seat. One way of overcoming this difficulty is to separate the front seat into a driver's portion and a passenger's portion, the driver's portion being narrower than the passenger's portion so as to clear the tunnel area. It is then only necessary to provide the driver's seat with a seat adjuster which can be located to the side of the tunnel area.

Many considerations must be taken into account in designing the seat adjuster, such as strength, stability, range of travel and the maintenance of foot room beneath the front seat for the rear seat passenger.

It is an object of the invention to provide a suitable seat adjuster in accordance with the foregoing.

Other objects of the invention will be apparent from the drawings and specification.

In the drawings:

Figure 1 is a perspective view of the front seat of an automotive vehicle;

Figure 2 is a left side elevation, partially broken away, of the seat adjuster;

Figure 3 is a sectional view taken on the plane indicated by the line 3—3 of Figure 4;

Figure 4 is a plan view, partially broken away, of the seat adjuster;

Figure 5:
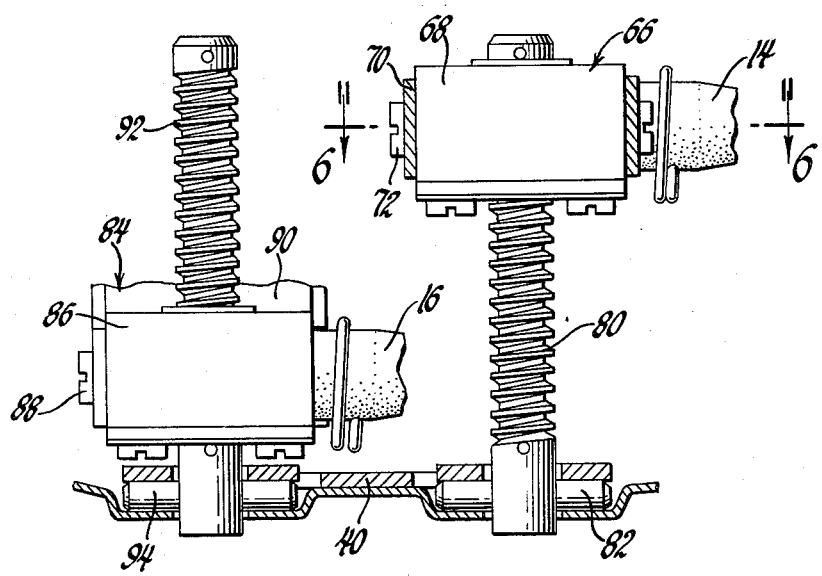
Figure 5 is a sectional view taken on the plane indicated by the line 5—5 of Figure 4.
Figure 6:
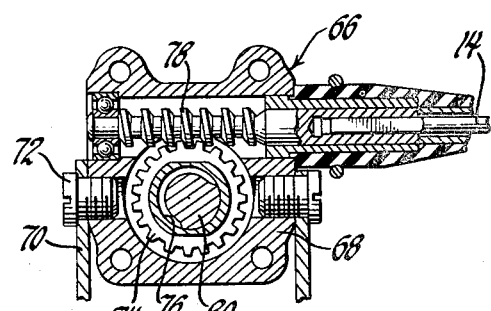
Figure 6 is a sectional view taken on the plane indicated by the line 6—6 of Figure 5.
Figure 7:
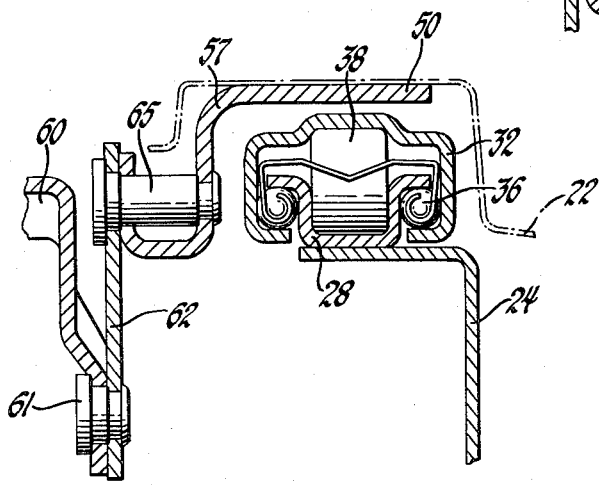
Figure 7 is a sectional view taken on the plane indicated by the line 7—7 of Figure 4.

Referring to the drawings, a passenger seat 10 is fixed to the floor of the vehicle and has located beneath it an electric motor 12 which is adapted to selectively drive flexible shafts 14, 16 and 18 in either direction by way of a solenoid operated multiple clutch 20. Such power means is conventional and is controlled by the driver by a horizontal drive selector switch, a front vertical drive selector switch and a rear vertical drive selector switch (not shown). The flexible shafts 14, 16 and 18 extend under a driver's seat 22 to power its supporting seat adjuster.

The seat adjuster structure comprises a spaced pair of lower track supports 24 and 26 secured to the vehicle floor and mounting a spaced pair of lower tracks 28 and 30. A spaced pair of upper tracks 32 and 34 are slidably mounted on the lower tracks in the conventional manner by balls 36 and rollers 38.

A saddle member 40 extends across the upper tracks 32 and 34 and is bolted thereto so as to move in a fore and aft direction with the upper tracks. The saddle 40 is depressed between the tracks so as to provide space beneath the driver's seat 22 for the vertical adjustment mechanism to be described and is located at the front portion of the tracks so as to provide foot room for the rear passenger. A spaced pair of pivots 42 and 44 are supported on the saddle 40 between the tracks by brackets 46 and 48 and these pivots provide a central support for frame members 50 and 52 of the driver's seat 22.

A rear U-shaped yoke 54 has its ends connected to brackets 53 and 55 on the seat frame members 50 and 52 near the rear ends thereof by pivots 56 and 58 and the yoke is pivotally mounted at its forward portion on the saddle pivots 42 and 44.

A front U-shaped yoke 60 has its forward portion pivotally connected to brackets 57 and 59 on the front ends of the seat frame members 50 and 52 by links 62 and 64 which have pivot connections 61 and 63 to the yoke and 65 and 67 to the brackets. The yoke 60 has its ends pivotally mounted on the saddle pivots 42 and 44.

A power unit 66 is driven by the flexible shaft 14 and provides a reaction force between the saddle 40 and the rear yoke 54 being connected thereto forward of the saddle pivots 42 and 44 to swing the yoke on the saddle pivots and provide vertical adjustment for the rear portion of the seat. The power unit 66 comprises a housing 68 mounted on a yoke bracket 70 by pivots 72 and having a rotatable gear 74 therein with a threaded bore 76. The gear 74 is drivingly engaged with a worm 78 driven by the flexible shaft 14 and a nonrotatable lead screw 80 is threaded in the bore of the gear. The lead screw 80 is supported at its lower end on the saddle 40 by a pivot 82. Rotation of the flexible shaft 14 will thus run the housing 68 up and down the lead screw 80 to swing the rear yoke 54 on the saddle pivots 42 and 44 and provide rear vertical adjustment for the seat.

A power unit 84, which is identical to the power unit 66, has its housing 86 mounted by pivots 88 to a bracket 90 on the front yoke 60 and has its nonrotatable lead screw 92 mounted on the saddle 40 by a pivot 94. The power unit 84 is connected to the flexible shaft 16 and reacts between the saddle and the front yoke 60 forward of the saddle pivots 42 and 44 to swing the yoke on the saddle pivots and provide vertical adjustment for the front portion of the driver's seat.

Another power unit 96, which is identical to the power units 66 and 84 has its housing 98 pivoted at 99 on a bracket 100 of the lower track support 24 and has its nonrotatable lead screw 102 connected at one end to the saddle 40 by a pivot 104. The power unit 96 is driven by the flexible shaft 18 and reacts between the lower track support 24 and the saddle to reciprocate the upper tracks on the lower tracks and thus provide horizontal adjustment for the driver's seat.

It is seen that the inventive seat adjuster provides a strong compact assembly which is of low height and which is primarily located beneath the front portion of the driver's seat so as to avoid interference with the tunnel area and with the foot room of the rear passenger.

While the embodiment of the invention here described is preferred, it is understood that modifications may be made by the exercise of skilled in the art which will lie within the scope of the invention.

We claim:

1. A power seat adjuster of the type providing selective vertical and tilt adjustments comprising a seat frame, a support member, a spaced pair of pivots carried by the support member, a first U-shaped yoke having a forward portion mounted on the support pivots and having its ends pivotally connected to the seat frame near the rear corners thereof, a second U-shaped yoke having a forward portion pivotally connected to the seat frame near the front corners thereof and having its ends mounted on the support pivots, first power means connecting and reacting between the support member and the first yoke forward of the support pivots to swing the first yoke on the support pivots and provide vertical adjustment for the rear portion of the seat frame, and second power means connecting and reacting between the support member and the second yoke forward of the support pivots to swing the second yoke on the support pivots and provide vertical adjustment for the front portion of the seat frame.

2. Apparatus as in claim 1 wherein each of said power means comprises a housing pivoted to the respective yoke, a gear rotatable in the housing and having a threaded bore, a nonrotatable lead screw threaded in the bore of the gear and pivotally supported at one end on the support member, and means for driving the gear.

3. A power seat adjuster of the type providing selective horizontal, vertical and tilt adjustments comprising a seat frame, a spaced pair of lower tracks, a spaced pair of upper tracks slidable thereon, a saddle connecting the upper tracks, a spaced pair of pivots carried by the saddle between the tracks, a first U-shaped yoke having a forward portion mounted on the saddle pivots and having its ends pivotally connected to the seat frame near the rear corners thereof, a second U-shaped yoke having a forward portion pivotally connected to the seat frame near the front corners thereof and having its ends mounted on the saddle pivots, first power means connecting and reacting between the saddle and the first yoke forward of the saddle pivots to swing the first yoke on the saddle pivots and provide vertical adjustment for the rear portion of the seat frame, second power means connecting and reacting between the saddle and the second yoke forward of the saddle pivots to swing the second yoke on the saddle pivots and provide vertical adjustment for the front portion of the seat frame, and third power means connecting and reacting between the lower track support and saddle to reciprocate the saddle and upper upper tracks on the lower tracks and provide horizontal adjustment for the seat frame.

4. Apparatus as in claim 3 wherein said third power means comprises a housing pivoted to the lower track support, a gear rotatable in the housing and having a threaded bore, a nonrotatable lead screw threaded in the bore of the gear and pivotally supported at one end on the saddle, and means for driving the gear.

5. Apparatus as in claim 3 wherein each of said first and second power means comprises a housing pivoted to the respective yoke, a gear rotatable in the housing and having a threaded bore, a nonrotatable lead screw threaded in the bore of the gear and pivotally supported at one end of the saddle, and means for driving the gear.

6. Apparatus as in claim 5 wherein said third power means comprises a housing pivoted to the lower track support, a gear rotatable in the housing and having a threaded bore, a nonrotatable lead screw threaded in the bore of the gear and pivotally supported at one end on the saddle, and means for driving the gear.

References Cited in the file of this patent

UNITED STATES PATENTS

| | | |
|---|---|---|
| 1,664,129 | Pallenberg | Mar. 27, 1928 |
| 1,921,224 | Floraday | Aug. 8, 1933 |
| 2,809,688 | Brundage | Oct. 15, 1957 |
| 2,827,947 | Wilkinson | Mar. 25, 1958 |
| 2,839,124 | Desmond | June 17, 1958 |

FOREIGN PATENTS

| | | |
|---|---|---|
| 505,703 | Great Britain | May 16, 1939 |